United States Patent
Ellis et al.

(10) Patent No.: US 9,244,991 B2
(45) Date of Patent: Jan. 26, 2016

(54) UNIFORM SEARCH, NAVIGATION AND COMBINATION OF HETEROGENEOUS DATA

(71) Applicant: International Business Machines Corporation, Armonk, NY (US)

(72) Inventors: Jason B. Ellis, New York, NY (US); Oktie Hassanzadeh, White Plains, NY (US); Michael J. Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 320 days.

(21) Appl. No.: 13/968,486

(22) Filed: Aug. 16, 2013

(65) Prior Publication Data

US 2015/0052125 A1    Feb. 19, 2015

(51) Int. Cl.
*G06F 17/30* (2006.01)

(52) U.S. Cl.
CPC .... *G06F 17/30572* (2013.01); *G06F 17/30554* (2013.01); *G06F 17/30477* (2013.01)

(58) Field of Classification Search
CPC .............. G06F 17/30554; G06F 17/30572; G06F 17/30696; G06F 17/30867; G06F 17/30864; G06F 17/2247; G06F 17/30477
USPC ................................ 707/722, 724
See application file for complete search history.

(56) References Cited

U.S. PATENT DOCUMENTS

| | | | |
|---|---|---|---|
| 5,584,024 A | 12/1996 | Shwartz | |
| 6,353,830 B1 | 3/2002 | Yee et al. | |
| 6,947,928 B2 | 9/2005 | Dettinger et al. | |
| 7,698,479 B2 * | 4/2010 | Georgalas | G06F 17/30315 710/36 |
| 8,312,038 B2 | 11/2012 | Ceballos et al. | |
| 2003/0033295 A1 | 2/2003 | Adler et al. | |
| 2005/0203924 A1 * | 9/2005 | Rosenberg | G06F 17/30696 1/1 |
| 2011/0196864 A1 | 8/2011 | Mason et al. | |
| 2012/0053953 A1 * | 3/2012 | Giust | G06Q 30/0278 705/1.1 |
| 2012/0246154 A1 | 9/2012 | Duan et al. | |
| 2012/0246175 A1 | 9/2012 | Duan et al. | |
| 2013/0018916 A1 * | 1/2013 | Busch | G06F 17/30622 707/771 |

OTHER PUBLICATIONS

Samur F. C. De Araujo et al., "Explorator: a tool for exploring RDF data through direct manipulation." LDOW 2009, Apr. 20-24, 2009.
Web of Science, http://images.webofknowledge.com/WOK45/help/WOS/ht_history_page.html, Copyright 2009.

(Continued)

*Primary Examiner* — Apu Mofiz
*Assistant Examiner* — Fariborz Khoshnoodi
(74) *Attorney, Agent, or Firm* — David Zwick; Nidhi Garg (57) ABSTRACT

A method and system for interfacing with an end user to search, navigate, and combine large numbers of heterogeneous data sources with varying data characteristics. End user entered search terms are received and the end user is then presented a guided exploration including search results and search result details. The end user is also presented with a guided combination including search result combination options and combination details. Both the guided exploration and guided combination render all data from the heterogeneous data sources in a uniform data format and both can culminate in saving selected results.

14 Claims, 8 Drawing Sheets

(56) References Cited

OTHER PUBLICATIONS

Davies et al., "Making the Semantic Web usable: interface principles to empower the layperson", Texas Digital Library, vol. 12, No. 1, (2011), pp. 1-14, http://journals.tdl.org/jodi/index.php/jodi/article/view/746/1182.

Pending U.S. Appl. No. 13/491,724, entitled Linking Data Elements Based on Similarity of Data Values and Semantic Annotations, filed Jul. 8, 2012.

Pending U.S. Appl. No. 13/543,872 (which is a continuation of U.S. Appl. No. 13/491,724), entitled Linking Data Elements Based on Similarity of Data Values and Semantic Annotations, filed Jul. 8, 2012.

* cited by examiner

UNIFORM SEARCH, NAVIGATION AND COMBINATION OF HETEROGENEOUS DATA

BACKGROUND

The disclosure relates generally to data retrieval systems and more specifically to a method, computer program and computer system for searching, navigating and combining large numbers of heterogeneous data sources with varying data characteristics. Examples of heterogeneous data sources may be found in, for example, U.S. patent application Ser. No. 13/070,193, entitled AGGREGATING SEARCH RESULTS BASED ON ASSOCIATING DATA INSTANCES WITH KNOWLEDGE BASE ENTITIES, filed on Mar. 23, 2011; U.S. patent application Ser. No. 13/070,238, entitled ANNOTATING SCHEMA ELEMENTS BASED ON ASSOCIATING DATA INSTANCES WITH KNOWLEDGE BASE ENTITIES, filed on Mar. 23, 2011; U.S. patent application Ser. No. 13/491,724, entitled LINKING DATA ELEMENTS BASED ON SIMILARITY OF DATA VALUES AND SEMANTIC ANNOTATIONS, filed on Jul. 8, 2012; and U.S. patent application Ser. No. 13/543,872, entitled LINKING DATA ELEMENTS BASED ON SIMILARITY OF DATA VALUES AND SEMANTIC ANNOTATIONS, filed on Jul. 8, 2012, are hereby incorporated by reference.

Businesses accumulate massive amounts of data from a variety of sources and employ an increasing number of heterogeneous, distributed, and often legacy data sources to store them. Although many data sources are available, navigating the large amounts of data in multiple data sources and correlating those heterogeneous sources with all the relevant data a user is interested in obtaining can be a difficult process. Searching and combining information across these heterogeneous data sources and varying data types requires users to be highly technical and understand how to use relevant query languages for each data source and then manually merge results.

Keyword searches are a popular way of finding information on the Internet. However, a keyword search can be undesirable in business contexts. For example, a business analyst of a technology company may be interested in analyzing the company's records for customers in the healthcare industry. Given keyword search functionality, the analyst might issue a "healthcare customers" query over a large number of data sources. Although the search will return results that use the word "healthcare" or some derivative thereof, the search would not return, for example, "Entity A" even though Entity A is a company in the healthcare industry. The search would also fail to provide a connection between Entity A and Subsidiary B, even though the former acquired the latter. As data increases in size and complexity, and as the number of data sources multiply, a simple keyword-based search will provide far more results than are easily managed.

SUMMARY

It would be desirable to increase the usefulness of retrieved data in a search. The usefulness of data can be increased when the data is placed into proper context and interrelated.

In one aspect, a method for unified search and navigation of heterogeneous data sources includes receiving a search keyword from a user interface, using a computer system configured to receive the search keyword and searching, using the computer system, a plurality of heterogeneous data sources, which include data in a variety of data formats, for the received search keyword. The method forms an abstract of the variety of data formats to present the user interface a uniform data format. The method further includes sending a first data set, in the uniform data format, to the user interface. The first data set sent to the user interface includes a search result from searching the heterogeneous data sources. The method further includes receiving a first indicator, from the user interface, identifying a selected search result selected from the first data set. The method further includes sending a second data set, in the uniform data format, to the user interface. The second data set includes a data sample; the data sample corresponds to the selected search result selected from the first data set. The method further includes receiving a second indicator, from the user interface, identifying a selected data sample to save, the selected data sample is selected from the second data set. The method further includes sending, to the user interface, a third data set. The third data set includes a named representation of the selected data sample.

In another aspect, a computer program product for unified search and navigation of heterogeneous data sources includes one or more computer-readable tangible storage devices and program instructions stored on at least one of the one or more computer-readable tangible storage devices. The program instructions include program instructions to receive a search keyword from a user interface and to search a plurality of heterogeneous data sources, which include a variety of data formats, for the received search keyword. The computer program product forms an abstract of the variety of data formats to present the user interface a uniform data format. The program instructions further include program instructions to send a first data set to the user interface, in the uniform data format. The first data set sent to the user interface includes a search result from searching the heterogeneous data sources. The program instructions further include program instructions to receive a first indicator, from the user interface, to identify a selected search result selected from the first data set. The program instructions further include program instructions to send a second data set, in the uniform data format, to the user interface. The second data set includes a data sample; the data sample corresponds to the selected search result selected from the first data set. The program instructions further include program instructions to receive a second indicator, from the user interface, identifying a selected data sample to save, the selected data sample selected from the second data set. The program instruction further includes program instructions to send, to the user interface, a third data set. The third data set includes a named representation of the selected data sample.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Embodiments of the present invention recognize the difficulty accessing the vast amounts of data available in heterogeneous data sources, by non-technical end users. Embodiments of the present invention allow the end user to focus on the exploration of data rather than on the complexities of heterogeneous data sources, incompatible data formats and query languages. End users need to access data from sources with various formats ranging from simple spreadsheet text files to XML files with no given schema (metadata information that describes instances and elements in the data) to relational and resource description framework (RDF) data that conform to a given well-defined schema, without knowledge about the properties of the data.

Embodiments of the present invention present the end user a unified interface that abstracts the underlying differences among these heterogeneous data sources and data formats to produce uniform search results. While there is a chance that the result of an initial search is precisely what the user was seeking, it is perhaps more likely that the result is in the neighborhood of what was sought. Embodiments of the present invention may aid the end user by providing guided data navigation suggestions to locate related data during data exploration, by providing analysis to identify data similarities among disparate data sources, and by providing guided combination options. The guided data navigation suggestions may include, but are not limited to, suggestions based on schematic, semantic, and social information. Guided data navigation may aid the user in moving from the initial search landing point in the data to the precise result sought.

The end user interface for guided data exploration may include, but is not limited to, data samples aggregated to summarize the selected search results, to aid the user in deciding if they have found what they are looking for; suggestions for other fields in the same category as the current data sample; suggestions of adjacent data fields that might be of interest; suggestions of other categories with similar data as the current data sample; and other resources within the system that might be of interest. Selecting any suggestion may present the end user with new guided data exploration information for the suggested item, complete with new data samples and appropriate new suggestions.

There may be searches where the complete set of results spans multiple heterogeneous data sources. Embodiments of this invention may address such searches by providing the end user a unified interface that allows data from multiple heterogeneous data sources to be interrelated without regard to the properties of those data sources. Guided combination may aid the end user in determining which data sources to combine by presenting an analysis of data similarities among the heterogeneous data sources. Embodiments of the present invention may determine the data similarities based on schematic links within a single data source or based on semantic links across multiple heterogeneous data sources. The end user interface for guided combination may include, but is not limited to, a display of data fields from each of the data sources selected by the user along with the similarity measure analyzed for each data field. For example, if two data sources were selected to be analyzed and both data sources include data fields containing "New York", an exemplary measure for the similarity of the exact match may be 100%, 100, or 1. On the other hand, if one data source's data field contains "New York City" instead, the similarity measure would be lower than that of an exact match. Embodiments of the present invention may limit the number of data fields displayed in order to present the user with only those data fields that have passed a similarity threshold value determined to produce good combination results. Similarity analysis may be determined by, for example, but is not limited to, text similarity, as in the above example, geospatial similarity for data containing geospatial markers or time period similarity for data containing time markers.

Embodiments of the present invention enable the end user to iteratively save multiple search results during guided data exploration as well as iteratively save multiple combined results during guided combination, until a final combined result contains all the relevant data the user may be interested in obtaining.

Figure 1:
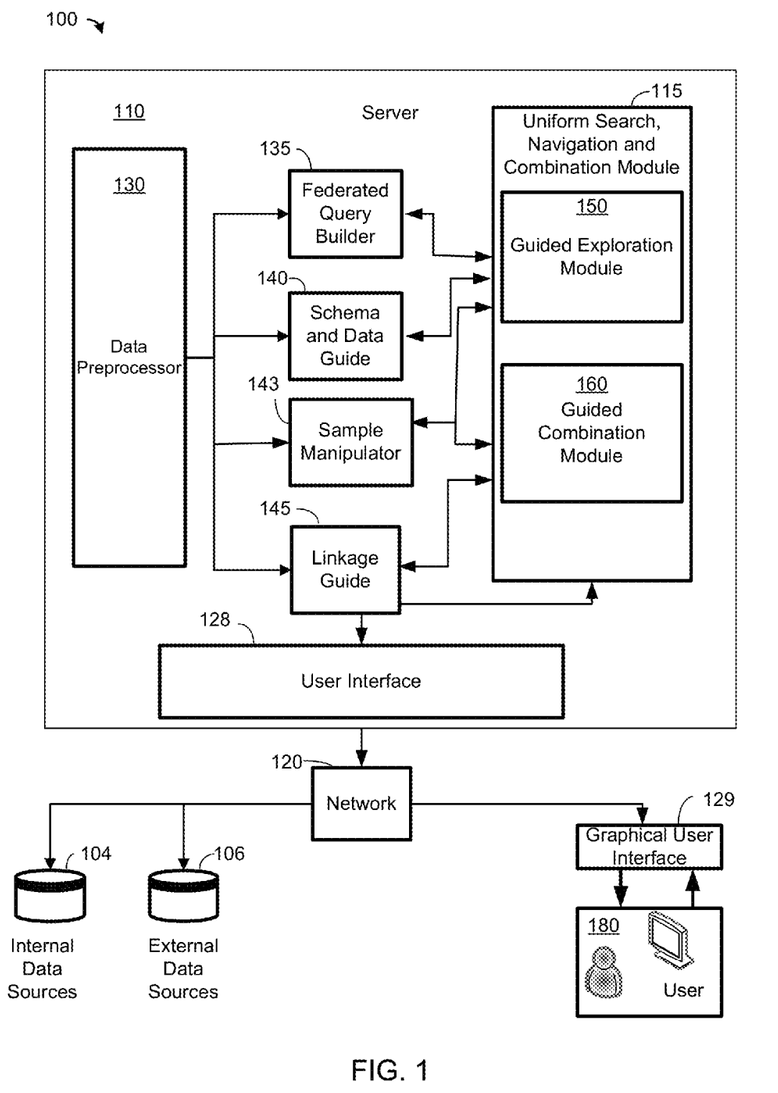
FIG. 1 is a functional block diagram illustrating a data processing environment depicted in accordance with an embodiment of the present invention.

Referring to FIG. 1, a data processing system 100 according to an embodiment of the invention is illustrated and discussed below. The data processing system 100 contains a network 120, which is the medium used to provide communication links between various data sources 104, 106, one or more end user 180 devices and computers connected together within and without data processing system 100. The network 120 may include connections, such as wire, wireless communication links, or fiber optic cables. The data processing system 100 also may be implemented as a number of different types of networks, such as an intranet, a local area network (LAN), or a wide area network (WAN). FIG. 1 is intended as an example, and not as an architectural limitation for the different embodiments.

A Uniform Search, Navigation and Combination module (USNC) 115 located in the data processing system 100 may be stored on one or more computer readable storage devices and may run on a server 110. The USNC 115 may be, for example, a computer program or program component for providing a uniform search, navigation and combining of heterogeneous data to a user interface 128, according to embodiments of the present invention. The USNC 115 may include, but is not limited to, a Guided Exploration module 150 and a Guided Combination module 160. The USNC 115 may be localized on one server, for example the server 110, and/or distributed between two or more servers.

As shown in FIG. 1, a Data Preprocessor 130 prepares both the internal data sources 104 and the external data sources 106 for analysis and may maintain a catalog of the available internal 104 and external 106 data sources. Such data sources may contain data of different formats, such as text, relational databases, and XML. The data may further have widely varying characteristics, including, for example, a large number of small records and a small number of large records. In an embodiment of the present invention, Data Preprocessor 130 may also take advantage of the external data sources 106 with application programming interfaces (APIs) that support different query languages. Users may furthermore add additional data sources as needed.

The Data Preprocessor 130 may provide other components in the data processing system 100 with a common access mechanism for the data sources 104, 106. For the internal data sources 104, the Data Preprocessor 130 may provide a level of indexing and analysis that depends on the type of data source. Indexing and caching may be bypassed for the external data sources 106 to allow fresh data to be retrieved from the external data sources 106 as needed. For the internal data sources 104, schema information may be stored and indexed by the Data Preprocessor 130. For legacy data sources with no given or well-defined schema as well as semi-structured or schema-free data, the Data Preprocessor 130 may perform schema discovery and analysis. In the case of relational data sources, the Data Preprocessor 130 may pick a sample of instance values for each column of a table and issue them as queries to the external data sources 106 to gather possible "senses" (i.e., extended data type and semantic information) of the instance values of the column. The result may be a set of tags associated with each column, along with a confidence value for the tag. Continuing with the healthcare example described above, "Entity A" may be associated with the type "Company," or the type "Healthcare Industry," or another type from an external data source 106. Depending on the implementation, more than one type may be associated with each instance, and multiple types may either be represented as a set or in some hierarchical or graphical structure.

In addition to schema information, the Data Preprocessor 130 may create a full-text index across all internal data sources 104. Different indexing strategies may be used depending on the data source characteristics. For a relational data source, for example, depending on the data characteristics and value distributions, the indexing may be performed over rows, where values are indexed and the primary key of their tuples are stored, or over columns, where values are indexed and columns of their relations are stored.

The data processing system 100 may further include a Federated Query Builder 135, a Schema and Data Guide 140, a Sample Manipulator 143 and a Linkage Guide 145. The Federated Query Builder 135 may be, for example, a computer program or program component for issuing queries for text searches, using an inverted index of data values, to the internal data sources 104, issuing queries as APIs to the external data sources 106, consolidating, and analyzing a potentially large and heterogeneous set of query results retrieved from several data sources 104, 106. In addition to retrieving data related to the text search, the Federated Query Builder 135 may issue additional queries to the external data sources 106 to gain additional information about unknown data instances returned from the text search. The Federated Query Builder 135 may further rank records returned from the text search based on attribute tags (e.g., "senses") created by the Data Preprocessor 130.

The Schema and Data Guide 140 may be, for example, a computer program or program component for determining similarity among records returned from the text search using both schematic and semantic differences. The Schema and Data Guide 140 may use this similarity to determine which additional fields may produce meaningful search results across instances from both the internal data sources 104 and the external data sources 106 using attribute tags (e.g., "senses") created by the Data Preprocessor 130 and the Federated Query Builder 135.

The Sample Manipulator 143 may be, for example, a computer program or program component for creating data subsets and data combinations across both the internal data sources 104 and the external data sources 106 using attribute tags (e.g., "senses") created by the Data Preprocessor 130 and the Federated Query Builder 135.

The Linkage Guide 145 may be, for example, a computer program or program component for determining which data fields may produce meaningful results when search results are combined. The Linkage Guide 145 may utilize both schematic and semantic links created by the Data Preprocessor 130 and the Federated Query Builder 135.

The USNC 115 may communicate with the end user 180 through a User Interface 128. The User Interface 128 communicates across the network 120 with a Graphical User Interface 129. The Graphical User Interface 129 may include, but is not limited to, a web application or a stand-alone application producing screen images to the end user's 180 device. The USNC 115 further connects to the Federated Query Builder 135 to perform a text search across multiple heterogeneous data sources 104, 106 simultaneously, to order the search results based on relevance and to further query relevant data sources 104, 106. The USNC 115 further connects to the Schema and Data Guide 140 to identify similarity among data fields, to the Sample Manipulator 143 to create useful data samples, and to the Linkage Guide 145 to identify data fields that may produce meaningful results when combined.

Now referring to FIGS. 2a-2d which illustrate examples of GUI screen images presented to the end user 180 (FIG. 1) during guided data exploration, in accordance with an embodiment of the present invention. These exemplary GUI screen images may be rendered to the end user 180 (FIG. 1) by, for example, the GUI 129 (FIG. 1). These examples and figures are illustrative rather than limiting.

Figure 2A:
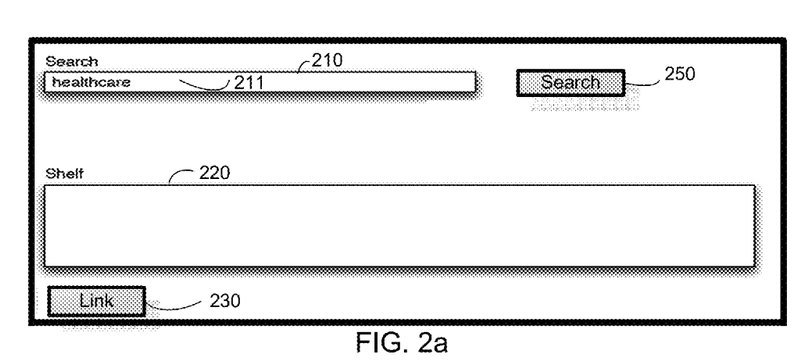
FIG. 2a is a block diagram depicting an exemplary graphical user interface (GUI) home screen for entering search keywords, in accordance with an embodiment of the present invention.

FIG. 2a illustrates an example of a "home" screen including a search entry field 210 where end user 180 (FIG. 1) may enter search keywords in a manner similar to traditional search engines. The "home" screen also may include a "SEARCH" button 250 to initiate the search. The "home" screen may include a shelf 220 to display named representations of saved data samples 225 (shown in FIG. 2d) and saved combination data samples 475 (shown in FIG. 4d) as well as a "LINK" button 230 for combining saved data samples 225 (FIG. 2d) and saved combination data samples 475 (FIG. 4d). FIG. 2a illustrates a search request 211 for "healthcare."

Figure 2B:
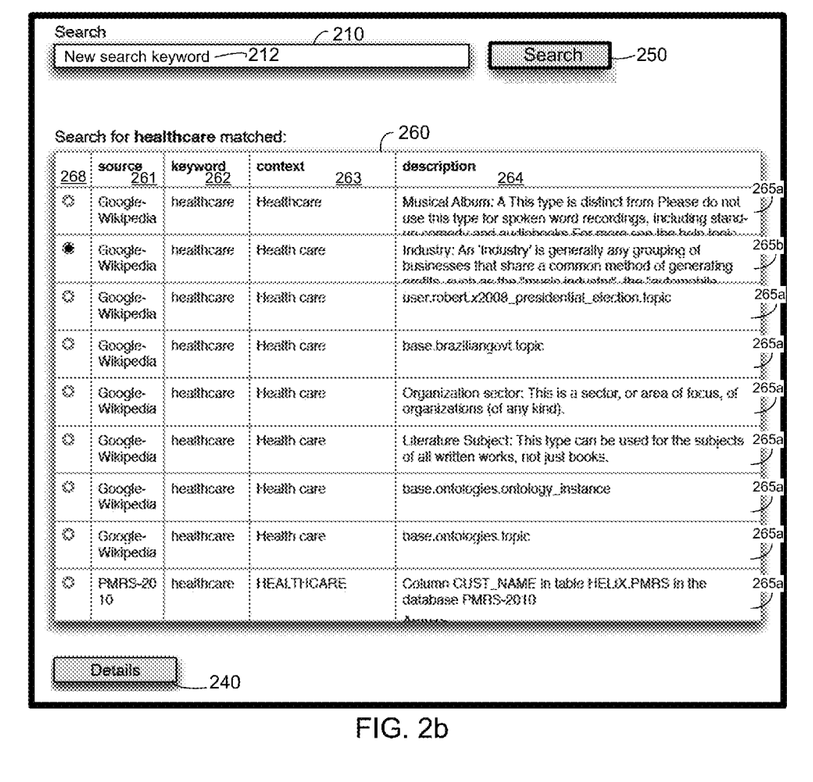
FIG. 2b is a block diagram depicting an exemplary GUI screen for displaying search results during guided data exploration, in accordance with an embodiment of the present invention.

FIG. 2b illustrates an example of a "results" screen including a first data set including information related to results of the "healthcare" search of FIG. 2a. In an embodiment of the present invention, the first data set may include a results table 260 including a plurality of search results 265a 265b. Each row of the results table 260 may further include a data source 261, specific text matched 262, a context of the match 263, a description of the context 264 and a selection indicator 268 for each search result 265a-b. From the results table 260, the end user 180 (FIG. 1) may select to further investigate a particular search result, such as search result 265b, by setting a selector indicator 268 corresponding to the particular search result to investigate further, and pressing the "DETAILS" button 240. Alternatively, the end user 180 may initiate a new search by entering a new search keyword 212 into the search entry field 210. FIG. 2b illustrates an example of the end user 180 (FIG. 1) selecting to further investigate the search result 265b associated with the context description 264 of "industry."

Figure 2C:
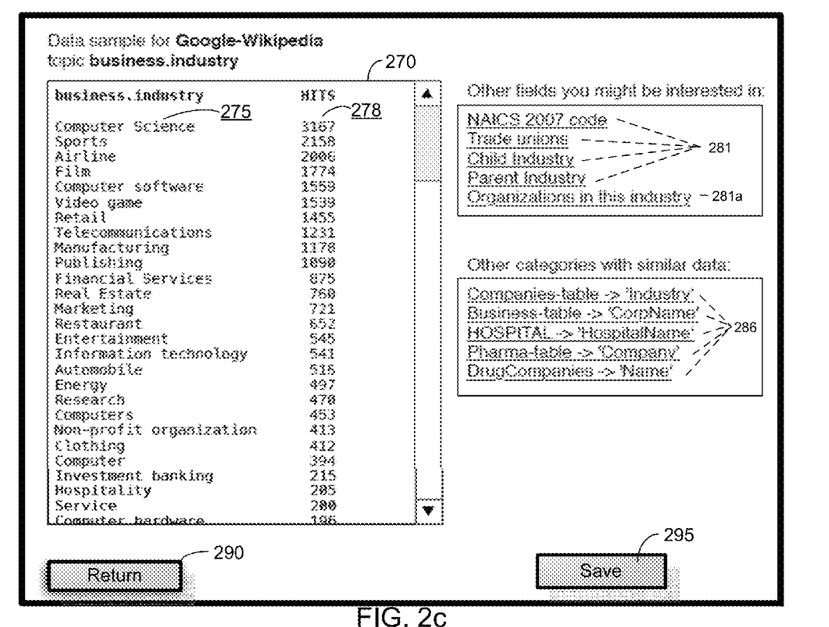
FIG. 2c is a block diagram depicting an exemplary GUI screen for displaying data samples and navigation suggestions during guided data exploration, in accordance with an embodiment of the present invention.

FIG. 2c illustrates an example of a "details" screen including a second data set resulting from pressing the "DETAILS" button 240 on the "results" screen. The second data set may include a data sample 270 and guided data navigation. The data sample 270 illustrates an aggregated summary of the search results selected on the "results" screen. In this example, the data sample 270 is aggregated based on a category of "industry." The data sample 270 may be displayed as, but not limited to, a summary of multiple data fields 275 within the data source 104, 106 (FIG. 1) along with a count of occurrences 278 of each data field 275 within the data source 104, 106 (FIG. 1). Guided data navigation suggestions 281, 286 may include suggestions to additional data from, but not limited to, adjacent data fields 281 and other categories of similar data 286 based on the current data sample 270. Selecting any guided navigation suggestion 281, 286 may present the end user 180 (FIG. 1) with a new data sample 270 and new guided navigation suggestions 281, 286 associated with the new data sample 270. The "details" screen may further include a "RETURN" button 290 and a "SAVE" button 295. Pressing the "RETURN" button 290 may return the end user 180 (FIG. 1) to the "results" screen from which the end user 180 (FIG. 1) may select different search results to investigate further. Pressing the "SAVE" button 295 may prompt the end user 180 (FIG. 1) for a name under which to save the current data sample 270.

Figure 2D:
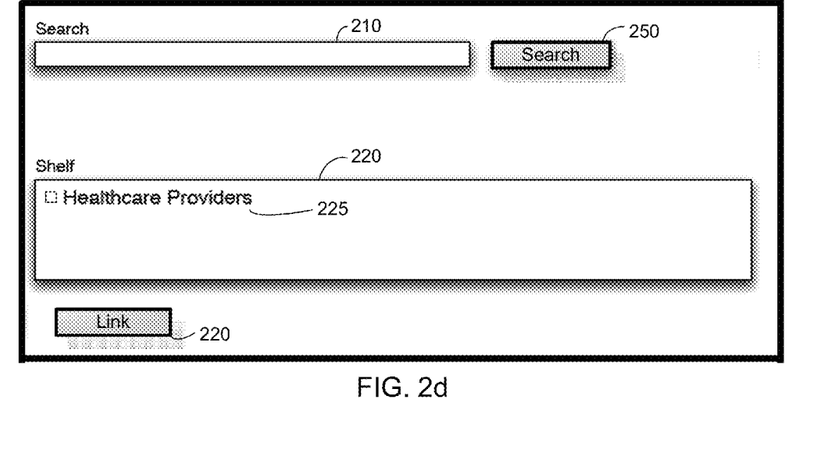
FIG. 2d is a block diagram depicting an exemplary GUI screen for displaying data samples saved on the shelf, in accordance with an embodiment of the present invention.

FIG. 2d illustrates an example of an updated "home" screen resulting from the end user 180 (FIG. 1) saving a desired data sample 270 on the "details" screen. FIG. 2d illustrates a third data set including a named representation of the saved data sample 225 displayed on the shelf 220. In the present example, the end user 180 (FIG. 1) selected a new data sample based on suggestion 281a "Organizations in this industry" on the "details" screen (shown in FIG. 2c). The resulting data sample was then saved by pressing the "SAVE" button 295 on the resulting "details" screen.

Figure 3:
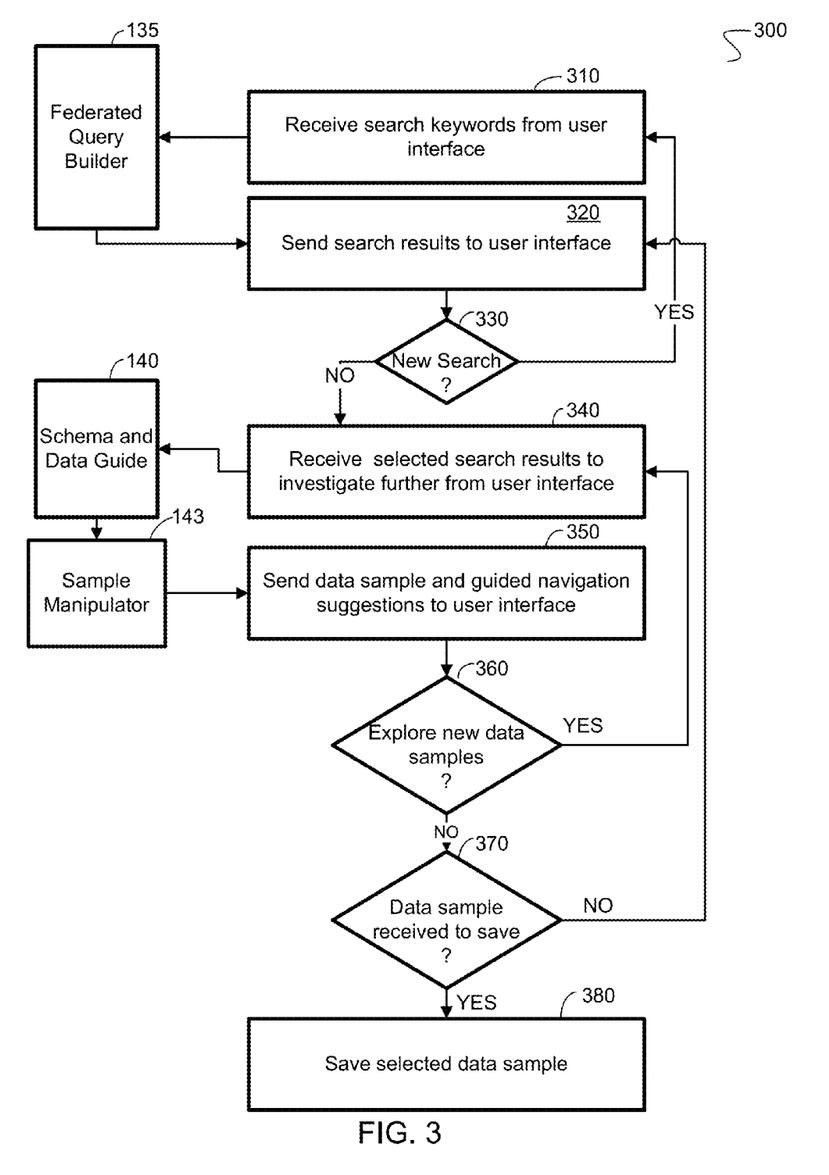
FIG. 3 is a flowchart illustrating steps performed by a Uniform Search, Navigation and Combination module (USNC), illustrated within the data processing environment of FIG. 1, for guiding data exploration, in accordance with an embodiment of the present invention.

Now referring to FIG. 3, a flowchart 300 illustrates steps performed by the USNC 115 and more specifically by the Guided Exploration module 150, within the data processing environment of FIG. 1. The steps of the flowchart 300 illustrate the uniform search, navigation and saving of heterogeneous data, in accordance with an embodiment of the present invention. The flowchart 300 will be described in detail below in conjunction with continuous reference to FIGS. 1, 2a, 2b, 2c and 2d. Embodiments of the present invention may provide the end user 180 a unified data exploration experience across multiple heterogeneous data sources and multiple data formats. Embodiments of the present invention may facilitate data exploration by allowing the end user 180 to navigate forward and backward through search requests, search results, data samples and navigation suggestions, until the desired data samples have been found. According to an embodiment of the present invention, the Guided Exploration module 150, at 310, receives search keywords 211 from the end user 180, as discussed above with reference to FIG. 2a, through the user interface 128. The text search keywords 211, as discussed above with reference to FIG. 2a, are an illustration only and do not limit the initial search to text search keywords. The Guided Exploration module 150 communicates the received search keywords 211 with the Federated Query Builder 135 where the end user's 180 search keywords 211 may be searched across the heterogeneous data sources 104, 106 and a variety of data formats. Domain specific queries and category specific queries may be performed. In most cases, more than one query type or set of key terms may be identified by the Federated Query Builder 135 and searches may be based on both schema and instance data. The Federated Query Builder 135 may return a ranked list of possible interpretations of the end user's 180 search keywords 211. The Guided Exploration module 150, at 320, may send the ranked list of interpretations along with an aggregation and visualization of the search results 260 to the user interface 128. The search results 260 sent to the user interface 128 may be uniform regardless of underlying data format and may be sorted based on, but not limited to, the data source 261, the specific text matched 262, or the details of the match 264, thus allowing the end user 180 multiple ways of aggregating the search results 260 for different attributes and data types. From here, the end user 180 may, at 330, select a search result (e.g. 265b) from the results table 260 to investigate further, by pressing the "DETAILS" button 240 on the "results" screen. Alternatively, the end user 180 may initiate a new search with new search keywords 211, pressing the "SEARCH" button 250.

The Guided Exploration module 150, at 340, receives a first indicator, resulting from the "DETAILS" button 240 being pressed on the "results" screen. The first indicator, received from the user interface 128, may identify a search result (e.g. 265b) that the end user 180 selects to investigate further. The Guided Exploration module 150 communicates the selected search result 265b to the Schema and Data Guide 140 and to the Sample Manipulator 143. The Schema and Data Guide 140 may determine similarity of the selected search result with other data for guided data navigation suggestions based on schematic and semantic links within a data source 104, 106 or across data sources 104, 106. The Sample Manipulator 143 may subset the search result based on the end user's 180 selected search result 265b, to create a manageable, useful data sample. The Guided Exploration module 150, at 350, may send to the user interface 128 a data sample 270 created for the selected search result 265b as well as guided data navigation suggestions 281, 286 to related data. The guided data navigation suggestions 281, 286 may be based on similarity measures returned from the Schema and Data Guide 140 for the selected search result 265b. The data sample 270 and guided data navigation suggestions 281, 286 sent to the user interface 128 may be uniform regardless of underlying data format.

As discussed above with reference to FIG. 2c, the end user 180 may, at 360, choose to explore new data samples by selecting a guided navigation suggestion 281, 286 or choose to continue with the current data sample 270. At 370, the end user may chose to save the current data sample 270 by pressing the "SAVE" button 295 on the "details" screen or the end user 180, may alternatively choose, at 370, to return to the "results" screen by pressing the "RETURN" button 290 on the "details" screen. Returning to the "results" screen may allow the end user 180 to explore additional search results or begin a new search. The Guided Exploration module 150, at 380, may receive a second indicator identifying the data sample 270 to be saved when the end user 180 presses the "SAVE" button 295 on the "details" screen. The end user 180 may be prompted for a name and the named representation of the data sample 225 saved on the shelf 220 as discussed above with reference to FIG. 2d, making it available for future use.

Now referring to FIGS. 4a-4d which illustrate examples of GUI screen images presented to the end user 180 (FIG. 1) during guided combination, in accordance with an embodiment of the present invention. These exemplary GUI screen images may be rendered to the end user 180 (FIG. 1) by, for example, the GUI 129 (FIG. 1). These examples and figures are illustrative rather than limiting.

Figure 4A:
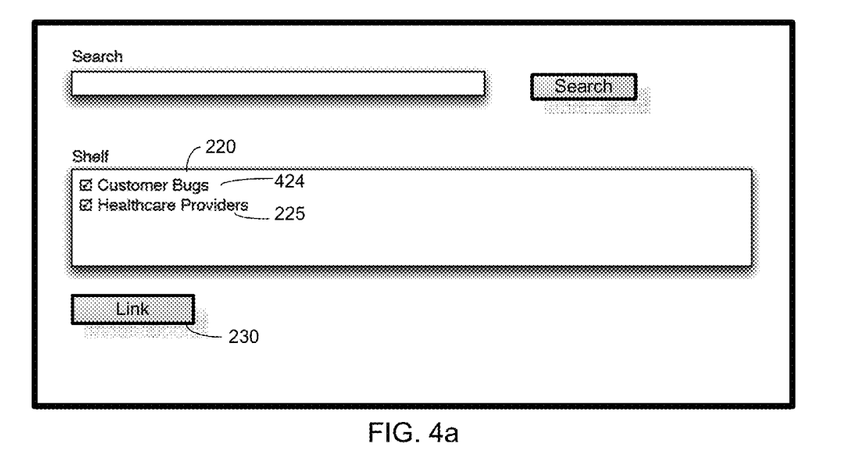
FIG. 4a is a block diagram depicting an exemplary GUI screen for displaying data samples saved on the shelf, in accordance with an embodiment of the present invention.

FIG. 4a illustrates another example of the "home" screen. In the present example, the end user 180 (FIG. 1) has already saved data samples 424, 225 to the shelf 220. In the present example, the saved data sample 424 "Customer Bugs" represents open customer problems identified from an internal data source 104. The saved data sample 225 represents the saved data sample discussed above with reference to FIG. 2d. The end user 180 (FIG. 1) wishing to combine these saved data samples 424, 225 indicates which saved data samples 424, 225 to combine and presses the "LINK" button 230.

Figure 4B:
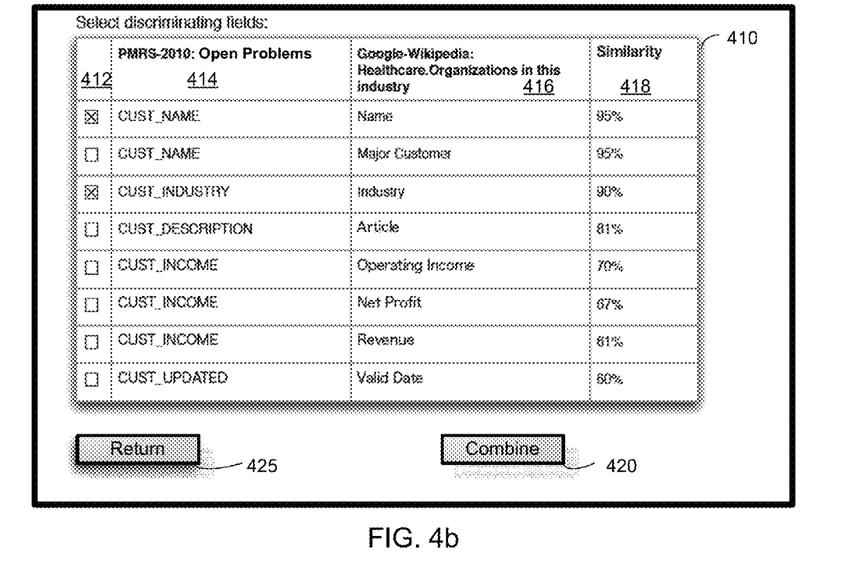
FIG. 4b is a block diagram depicting an exemplary GUI screen for displaying guided combination options during guided combination, in accordance with an embodiment of the present invention.

FIG. 4b illustrates an example of a "combination options" screen including a fourth data set resulting from selecting saved data samples 424, 225, as discussed above with reference to FIG. 4a, and pressing the "LINK" button on the "home" screen. The fourth data set includes guided combination options which may be displayed as a guided combination options table 410. The guided combination options table 410 may list sets of discriminating fields 414, 416 from each selected saved data sample 424, 225 (FIG. 4a) by which the end user 180 (FIG. 1) may choose to combine the selected saved data samples 424, 225 (FIG. 4a). The guided options table may also include a similarity measure 418 and a selection indicator 412 for each set of discriminating fields 414, 416. The "combination options" screen may further include a "RETURN" button 425 and a "COMBINE" button 420. Pressing the "RETURN" button 425 may return the end user 180 (FIG. 1) to the "home" screen of FIG. 4a from which the end user 180 (FIG. 1) may select different saved data samples from the shelf 220 or initiate a new search. The end user 180 (FIG. 1) may choose to further investigate the combined saved data samples 424, 225 by pressing the "COMBINE" button 420.

In the present example, the end user 180 (FIG. 1) has set the selection indicators 412 on for discriminating field 414, 416 sets "CUST_NAME, Name" and "CUST_INDUSTRY, Industry" as the guided combination options from which to combine the saved data samples 424, 225. The end user may then press the "COMBINE" button 420 to create a combination data sample 440, as discussed below in reference to FIG. 4c.

Figure 4C:
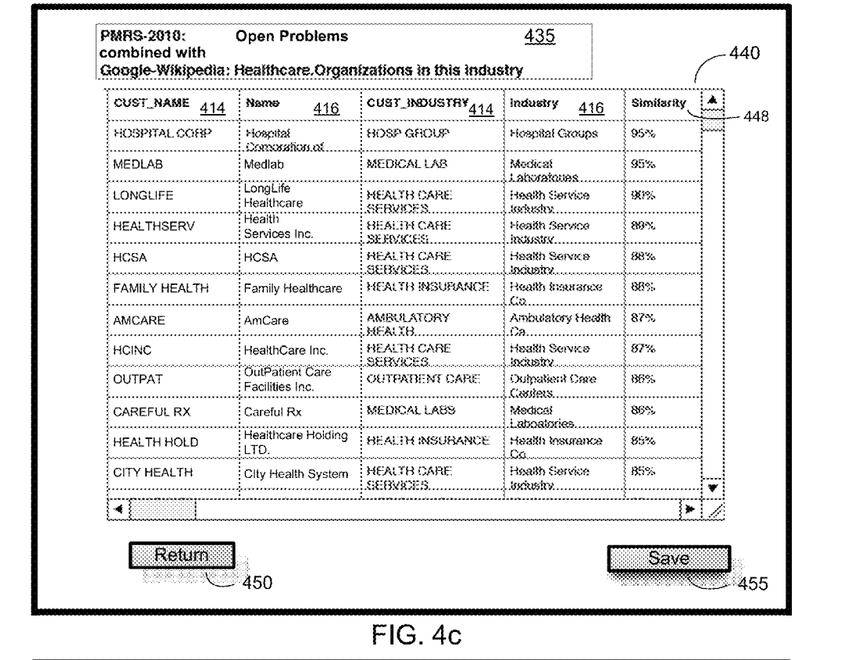
FIG. 4c is a block diagram depicting an exemplary GUI screen for displaying combination data samples during guided combination, in accordance with an embodiment of the present invention.
Figure 4D:
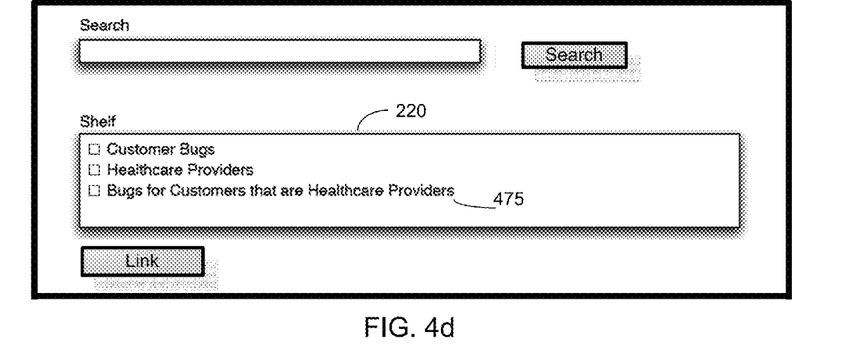
FIG. 4d is a block diagram depicting an exemplary GUI screen for displaying combination data samples saved on the shelf, in accordance with an embodiment of the present invention.

FIG. 4c illustrates an example of a "combination details" screen including a fifth data set resulting from pressing the "COMBINE" button 420 on the "combination options" screen, as discussed above with reference to FIG. 4b. The fifth data set may include a combination data sample 440 and a display 435 of the data source(s) 104, 106 from which the data samples originated. The combination data sample 440 may include, but is not limited to, a plurality of rows displaying data from the discriminating fields 414, 416 selected in FIG. 4b along with a similarity measure 448 for all of the data in each row. The "combination details" screen may further include a "RETURN" button 450 and a "SAVE" button 455. Pressing the "RETURN" button 450 may return the end user 180 (FIG. 1) to the "combination options" screen of FIG. 4b from which the end user 180 (FIG. 1) may select different guided combination option(s) 412. Pressing the "SAVE" button 455 may prompt the end user 180 (FIG. 1) for a name under which to save the combination data sample 440.

FIG. 4d illustrates an example of an updated "home" screen resulting from the end user 180 (FIG. 1) saving a desired combination data sample 440 on the "combination details" screen. FIG. 4d illustrates a sixth data set including a named representation of the saved combination data sample 475, now displayed on the shelf 220.

Figure 5:
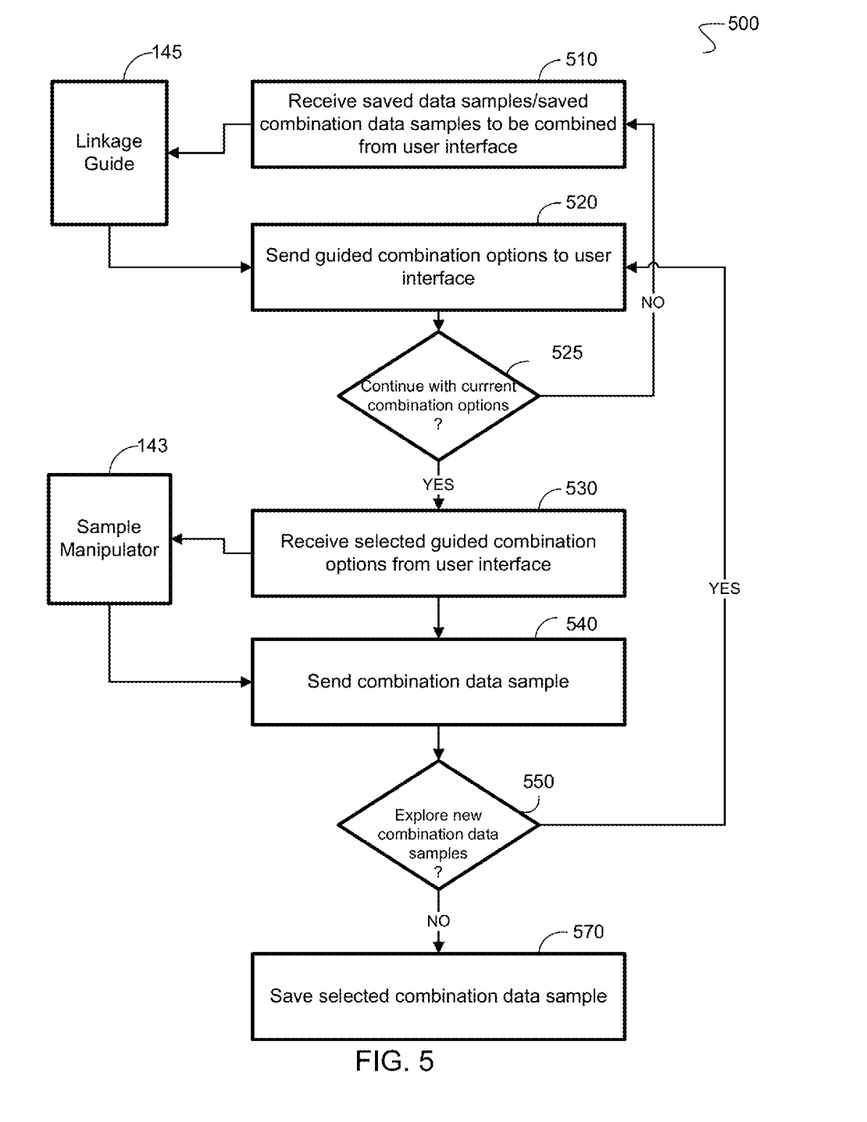
FIG. 5 is a flowchart illustrating steps performed by the USNC, illustrated within the data processing environment of FIG. 1, for guiding data combination, in accordance with an embodiment of the present invention.

Now referring to FIG. 5, a flowchart 500 illustrates steps performed by the USNC 115 and more specifically by the Guided Combination module 160, within the data processing environment of FIG. 1. The steps of the flowchart 500 illustrate the uniform guided combination of heterogeneous saved data samples 225, 424 (as discussed above in reference to FIG. 4a) and/or saved combination data samples 475 (as discussed above in reference to FIG. 4d), and saving of heterogeneous combination data samples, in accordance with an embodiment of the present invention. The flowchart 500 will be described in detail below in conjunction with continuous reference to FIGS. 1, 4a, 4b, 4c, and 4d. Embodiments of the present invention may provide the end user 180 with a unified data combination experience across multiple heterogeneous data sources and multiple data formats. Embodiments of the present invention may facilitate data combination by allowing the end user 180 to navigate forward and backward through various data combination options and combination data samples until the desired combination data sample has been found.

According to an embodiment of the present invention, the Guided Combination module 160, at 510, may receive a third indicator, through the user interface 128, identifying saved data samples 225, 424 or saved combination data samples 475 the end user 180 selected to combine, as discussed above with reference to FIG. 4a. The Guided Combination module 160 may communicate with the Linkage Guide 145 to identify which data fields among the end user 180 selected saved data samples 225, 424 or saved combination data samples 475 may produce meaningful results when combined. Meaningful results may be based on geospatial similarity for data containing geospatial markers or time period similarity for data containing time markers. The Guided Combination module 160, at 520, may send a ranked list of guided combination options, based on similarity, to the user interface 128. In one embodiment, the list of guided combination options may be truncated based on a similarity threshold. The Guided Combination module 160 may also send a similarity measure 418 within the guided combination options table 410. The guided combination options table 410 sent to the user interface 128 may be uniform regardless of heterogeneous data sources 104, 106 or underlying data format.

The end user 180 may then choose, at 525, to further examine the selected saved data samples 225, 424 and/or saved combination data samples 475 by selecting one or more guided combination options 412 from the options table 410 and pressing the "COMBINE" button 420 on the "combination options" screen. Alternatively, the end user 180 may return to the "home" screen by pressing the "RETURN" button 425. The Guided Combination module 160, at 530, may receive a fourth indicator from the user interface 128 identifying the end user's 180 selection of one or more guided combination options 412. The Guided Combination module 160 may communicate with the Sample Manipulator 143 to create a combination data sample 440 based on the end user's 180 selection of guided combination options 412. The Guided combination module 160, at 540, may send the created combination data sample 440 to the user interface 128. The combination data sample 440 sent to the user interface 128 may be uniform regardless of heterogeneous data sources 104, 106 or underlying data format.

As discussed above with reference to FIG. 4c, the end user 180 may, at 550, choose to explore new combination data samples by pressing the "RETURN" button 450 to return to the "combination options" screen or choose to save the current combination data sample 440 by pressing the "SAVE" button 455. The Guided Combination module 160, at 570, may receive a fifth indicator identifying the combination data sample 440 to be saved. The end user 180 may be prompted for a name, and the named representation of the combination data sample 475 saved on shelf 220, as discussed above with reference to FIG. 4d, alongside saved data samples 225, 424 which were saved during guided data exploration, making the saved combination data sample 475 available for future use.

Thereby, in the embodiments of the present invention as discussed above, one or more methods for unified search and navigation of heterogeneous data sources is described. The embodiments may form an abstract of the variety of data formats included in the heterogeneous data sources 104, 106 for the end user 180, in order to send a uniform data format to the user interface 128.

The search keyword embodied as search entry 211 (FIG. 2a) may be received from a user interface 128 (FIG. 1), as in step 310 of method 300 (FIG. 3) resulting in a search of the heterogeneous data sources 104, 106 (FIG. 1) utilizing the received search keyword. The search result (FIG. 2b), in the uniform data format, may be sent to the user interface 128 (FIG. 1) as a first data set, as in step 320 of method 300 (FIG. 3).

When the end user 180 (FIG. 1) selects a search result to further explore (such as 265b in FIG. 2b), a first indicator may be received from the user interface 128 (FIG. 1), as in step 340 of method 300 (FIG. 3), identifying a search result to further explore (265b in FIG. 2b). A second data set including a data sample and a guided navigation suggestion (FIG. 2c), corresponding to the search result to further explore, may be sent to the user interface 128 (FIG. 1) in the uniform data format, as in step 350 of method 300 (FIG. 3).

When the data sample 270 (FIG. 2c), includes the data the end user 180 (FIG. 1) requires, a second indicator may be received from the user interface 128 (FIG. 1), as in step 370 of method 300 (FIG. 3), identifying a data sample 270 (FIG. 2c) the end user 180 wishes to save. A third data set, including a named representation 225 (FIG. 2d) corresponding to the data sample 270 (FIG. 2c) the end user wishes to save, may be sent to the user interface 128 (FIG. 1) to place on the "home" page shelf 220 (FIG. 2d), as in step 380 of method 300 (FIG. 3).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
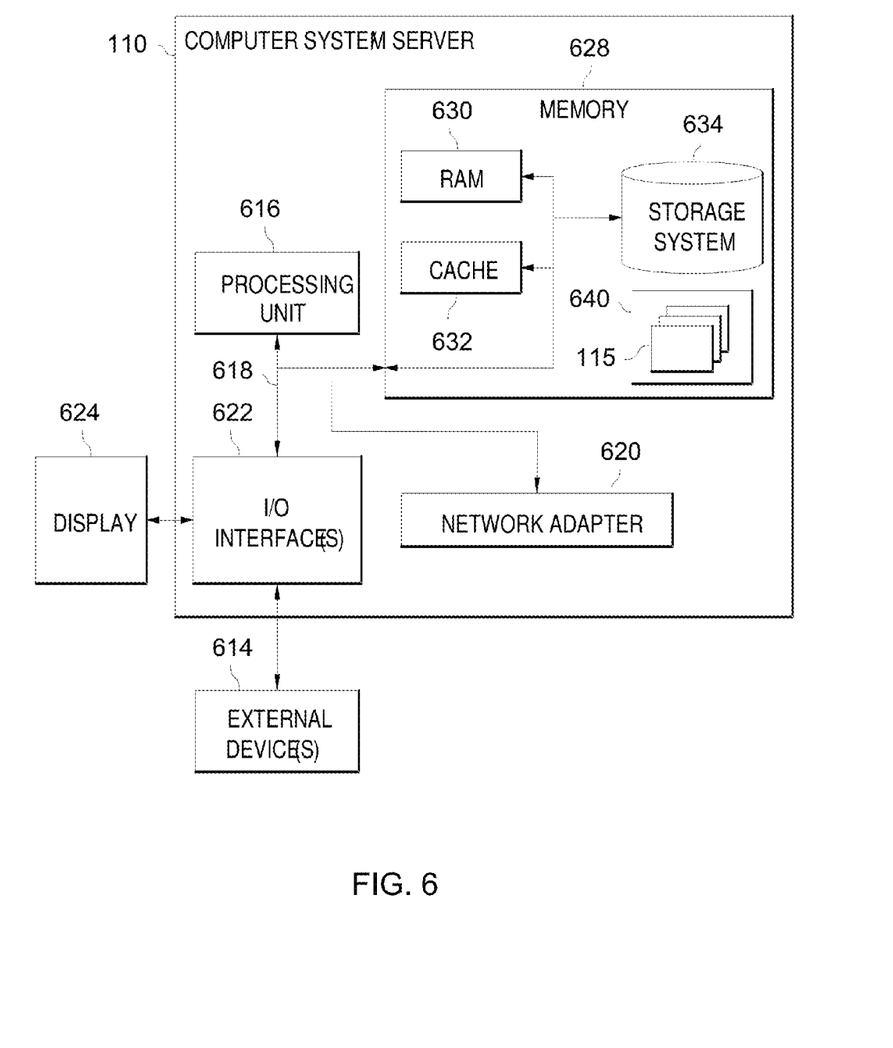
FIG. 6 is a schematic block diagram which illustrates internal and external components of a server computer in accordance with an illustrative embodiment.

FIG. 6 illustrates internal and external components of the server computer 110 shown in FIG. 1, in accordance with an illustrative embodiment. Server 110 is only one example of a suitable server computer and is not intended to suggest any limitation as to the scope of use or functionality of embodiments of the invention described herein. Regardless, server 110 is capable of being implemented and/or performing any of the functionality set forth hereinabove.

Server 110 is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Server 110 may be described in the general context of computer system-executable instructions, such as program modules, being executed by a computer system. Generally, program modules may include routines, programs, objects, components, logic, data structures, and so on that perform particular tasks or implement particular abstract data types. Server 110 may be practiced in distributed data processing environments where tasks are performed by remote processing devices that are linked through a communications network. In a distributed data processing environment, program modules may be located in both local and remote computer system storage media including memory storage devices.

Server 110 is shown in FIG. 6 in the form of a general-purpose computing device. The components of computer system/server 110 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 628 can include computer system readable media in the form of volatile memory, such as random access memory (RAM) 630 and/or cache memory 632. Computer system/server 110 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 115, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 115 generally carry out the functions and/or methodologies of embodiments of the invention as described herein.

Computer system/server 110 may also communicate with one or more external devices 614 such as a keyboard, a pointing device, a display 624, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 622. Still yet, computer system/server 110 can communicate with one or more networks such as a local area network (LAN), a general wide area network (WAN), and/or a public network (e.g., the Internet) via network adapter 620. As depicted, network adapter 620 communicates with the other components of computer system/server 110 via bus 618. It should be understood that although not shown, other hardware and/or software components could be used in conjunction with computer system/server 110. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for unified search and navigation of heterogeneous data sources, the method comprising:
   receiving a search keyword from a user interface, using a computer system configured to receive the search keyword;
   searching a plurality of heterogeneous data sources utilizing the search keyword, using the computer system, wherein the plurality of heterogeneous data sources include data in a variety of data formats, and wherein the computer system forms an abstract of the variety of data formats of the heterogeneous data sources and presents the abstract of the variety of data formats in a uniform data format;
   sending a first data set, in the uniform data format, to the user interface, wherein the first data set comprises a search result from searching the heterogeneous data sources;
   receiving a first indicator from the user interface identifying a selected search result selected from the first data set;
   sending a second data set in the uniform data format to the user interface, wherein the second data set comprises a data sample, and wherein the data sample corresponds to the selected search result selected from the first data set;
   receiving a second indicator from the user interface identifying a selected data sample to save, wherein the selected data sample is selected from the second data set;
   sending a third data set to the user interface, wherein the third data set comprises a named representation of the selected data sample;
   receiving a plurality of third indicators from the user interface identifying a plurality of selected third data sets to combine;
   sending a fourth data set to the user interface in the uniform data format, wherein the fourth data set comprises a guided combination option for the plurality of selected third data sets;
   receiving a fourth indicator from the user interface identifying a selected guided combination option selected from the fourth data set to utilize in combining the plurality of selected third data sets;
   sending a fifth data set to the user interface in the uniform data format, wherein the fifth data set comprises a combination data sample from the plurality of selected third data sets utilizing the selected guided combination option selected from the fourth data set;
   receiving a fifth indicator from the user interface identifying a selected combination data sample to save, wherein the selected combination data sample is selected from the fifth data set; and
   sending a sixth data set to the user interface, wherein the sixth data set comprises a named representation of the selected combination data sample.

2. The method of claim 1, wherein the second data set further comprises a guided data navigation suggestion, and wherein the guided data navigation suggestion corresponds to the selected search result selected from the first data set.

3. The method of claim 1, wherein the third data sets selected comprise the sixth data sets.

4. The method of claim 1, wherein the fourth data set comprises combination options based on geospatial similarity among the plurality of selected third data sets.

5. The method of claim 1, wherein the fourth data set comprises combination options based on time period similarity among the plurality of selected third data sets.

6. The method of claim 1, wherein the fourth data set comprises combination options based on textual similarity among the plurality of selected third data sets.

7. The method of claim 1, wherein the searching utilizes an inverted index of data values.

8. A computer program product for unified search and navigation of heterogeneous data sources, the computer program product comprising one or more computer-readable tangible storage devices and program instructions stored on at least one of the one or more computer-readable tangible storage devices, the program instructions comprising:
   program instructions to receive a search keyword from a user interface;
   program instructions to search a plurality of heterogeneous data sources utilizing the search keyword, wherein the plurality of heterogeneous data sources include data in a variety of data formats, and wherein the program instructions form an abstract of the variety of data formats of the heterogeneous data sources and present the abstract of the variety of data formats in a uniform data format;
   program instructions to send a first data set, in the uniform data format, to the user interface, wherein the first data set comprises a search result from searching the heterogeneous data sources;
   program instructions to receive a first indicator from the user interface identifying a selected search result selected from the first data set;
   program instructions to send a second data set in the uniform data format to the user interface, wherein the second data set comprises a data sample, and wherein the data sample corresponds to the selected search result selected from the first data set;
   program instructions to receive a second indicator from the user interface identifying a selected data sample to save, wherein the selected data sample is selected from the second data set;
   program instructions to send a third data set to the user interface, wherein the third data set comprises a named representation of the selected data sample;
   program instructions to receive a plurality of third indicators from the user interface identifying a plurality of selected third data sets to combine;
   program instructions to send a fourth data set to the user interface in the uniform data format, wherein the fourth data set comprises a guided combination option for the plurality of selected third data sets;
   program instructions to receive a fourth indicator from the user interface identifying a selected guided combination option selected from the fourth data set to utilize in combining the plurality of selected third data sets;
   program instructions to send a fifth data set to the user interface in the uniform data format, wherein the fifth data set comprises a combination data sample from the plurality of selected third data sets utilizing the selected guided combination option selected from the fourth data set;

program instructions to receive a fifth indicator from the user interface identifying a selected combination data sample to save, wherein the selected combination data sample is selected from the fifth data set; and program instructions to send a sixth data set to the user interface, wherein the sixth data set comprises a named representation of the selected combination data sample.

9. The computer program of claim 8, wherein the second data set further comprises a guided data navigation suggestion, and wherein the guided data navigation suggestion corresponds to the selected search result selected from the first data set.

10. The computer program product of claim 8, wherein the third data sets selected comprises the sixth data sets.

11. The computer program product of claim 8, wherein the fourth data set comprises combination options based on geospatial similarity among the plurality of selected third data sets.

12. The computer program product of claim 8, wherein the fourth data set comprises combination options based on time period similarity among the plurality of selected third data sets.

13. The computer program product of claim 8, wherein the fourth data set comprises combination options based on textual similarity among the plurality of selected third data sets.

14. The computer program product of claim 8, wherein the program instructions to search utilize an inverted index of data values.

* * * * *